United States Patent [19]

Schnorrer

[11] Patent Number: 5,741,353
[45] Date of Patent: Apr. 21, 1998

[54] AQUEOUS PAINTING AGENT

[75] Inventor: Heinrich Schnorrer, Schwandorf, Germany

[73] Assignee: J.S. Staedtler GmbH & Co., Nürnberg, Germany

[21] Appl. No.: 671,350

[22] Filed: Jun. 27, 1996

[30] Foreign Application Priority Data

Jun. 29, 1995 [DE] Germany ............ 195 23 368

[51] Int. Cl.$^6$ ............ C09D 17/00
[52] U.S. Cl. ............ 106/31.29; 106/31.3; 106/31.31; 106/31.61; 106/31.62; 106/31.63
[58] Field of Search ............ 106/19 E, 31 R, 106/22 A, 20 C, 23 A, 31.29, 31.3, 31.31, 31.61, 31.62, 31.63

[56] References Cited

U.S. PATENT DOCUMENTS

| | | | |
|---|---|---|---|
| 3,949,132 | 4/1976 | Seregely et al. | 428/207 |
| 5,534,049 | 7/1996 | Wallstrom | 106/22 R |

FOREIGN PATENT DOCUMENTS

| | | |
|---|---|---|
| 2331636 | 1/1974 | Germany. |
| 3148698 | 4/1986 | Germany. |
| 3929391 | 5/1990 | Germany. |
| 3903824 | 11/1990 | Germany. |
| 78793 | 6/1993 | Germany. |
| 7118582 | 11/1991 | Japan. |

OTHER PUBLICATIONS

M. Doerner, Malmeterial Und Seine Verwendung Im Bilde, Ferdinand Enke Verlag Stuttgart (1971), S.133–135 und 212–213.

*Primary Examiner*—Deborah Jones
*Attorney, Agent, or Firm*—Friedrich Kueffner

[57] ABSTRACT

An aqueous writing agent, drawing agent or painting agent as an application material is composed of water, binding agent, coloring agent, surface-active agent and possibly other additives, such as particularly preservatives, thickening agent, filler and/or other addition agents, wherein the binding agent is or contains a wax or a wax mixture in an emulsified or dispersed state. The application material is present as a liquid or pasty material and can be used in or with various application devices or can also be used for finger painting. Specifically, the agent contains 40% to 80% by weight water, 10%–50% wax or wax mixture, 0.1% to 2% by weight surface-active agent or emulsifying agent, 01% to 10% by weight coloring agent, and 0.01% to 20% by weight other additives.

16 Claims, No Drawings

AQUEOUS PAINTING AGENT

BACKGROUND OF THE INVENTION

1. Field of the Invention

The present invention relates to an aqueous painting agent as an application material composed of water, binding agent, coloring agent, surface-active agent and possibly other additives, such as particularly preservatives, thickening agent, filler and/or other addition agents, wherein the binding agent is or contains a wax or a wax mixture in an emulsified or dispersed state. The application material is present as a liquid or pasty material and can be used in or with various application devices or can also be used for finger painting.

2. Description of the Related Art

Agents or materials of the above-described type are basically known in the art. For example, German patent 39 03 824 describes an aqueous paint composed of starch and/or water-soluble saccharides as binding agent, coloring agents and possibly other additives as preservatives, thickening agents, moistening agents and/or softening agents.

German patent 31 48 698 discloses an also essentially aqueous paint composed of solvents, binding agents, coloring agents and at least one surface-active emulsifying agent and possibly fillers and/or other additives with various washing active substances.

Paints of this type are applied with the use of various devices, such as, brushes or felt-type writing instruments or other wick-type writing instruments or by means of spatulas or also with the fingers and are usually present in a low viscosity to high viscosity state or in a pasty state.

The paints should additionally be easily washable and should also be toxicologally safe.

However, it is not possible with these known agents to achieve transparent opaque strokes or applications, nor strokes or applications which cover well or which are glossy and/or can be polished by the application of pressure.

German patent 39 29 391 describes a drawing and painting material having a pastel-like delivery, wherein the material is present in the solid state and is supposed to facilitate an especially color-intensive application and is supposed to be capable of being painted over several times. For this purpose, it is proposed to admix to the painting material present in the form of leads or chalks spherically-shaped glass particles having a particle size of 0.5 to 30 μm. However, these solid substances cannot be used in wick-type or felt-type writing utensils or application devices, and they cannot be painted directly with the fingers or a brush unless they are additionally liquified or painted with liquid.

SUMMARY OF THE INVENTION

Therefore, it is the primary object of the present invention to provide an aqueous agent for painting or an application material which does not have the above-mentioned disadvantages and which especially facilitates transparent opaque strokes and applications which cover as much as possible and which may be capable of being polished by the application of pressure. In addition, the strokes should be easily dilutable and paintable with water and should adhere to different grounds and should be essentially water-resistant after drying.

In accordance with the present invention, the agent contains 40% to 80% by weight water, 10%–50% wax or wax mixture, 0.1% to 2% by weight surface-active agent or emulsifying agent, 0.1% to 10% by weight coloring agent, and 0.01% to 20% by weight other additives.

The various features of novelty which characterize the invention are pointed out with particularity in the claims annexed to and forming a part of the disclosure.

DETAILED DESCRIPTION OF TEE PREFERRED EMBODIMENTS

As illustrated by the following examples, the agent according to the present invention may have the following compositions:

Example 1

(1. Basic Example)

| | |
|---|---|
| Water | 40% to 80% by weight |
| Wax | 10% to 50% by weight |
| Coloring Agent | 0.1% to 10% by weight |
| Surface-Active Agent/ Emulsifying agent | 0.1% to 2% by weight |
| Other Additives | 0.01% to 20% by weight |

Example 2

(2. Basic Example)

| | |
|---|---|
| Water | 50% to 77% by weight |
| Wax | 15% to 45% by weight |
| Coloring Agent | 1% to 5% by weight |
| Surface-Active Agent/ Emulsifying agent | 0.1% to 1% by weight |
| Preservative | 0.01% to 0.2% by weight |
| Thickening Agent | 0% to 5% by weight |
| Dispersing Agent | 0% to 2% by weight |
| Other Additives | 0% to 12% by weight |

Example 3

(3. Basic Example)

| | |
|---|---|
| Water | 40% to 80% by weight |
| Wax | 10% to 50% by weight |
| Coloring Agent | 0.1% to 10% by weight |
| Thickening Agent | 1% to 4% by weight |
| Preservative | 0.01% to 0.05% by weight |
| Dispersing Agent | 0.8% to 1% by weight |
| Surface-Active Agent/ Emulsifying agent | 0.3% to 1% by weight |
| Other Additives | 0% to 10% by weight |

Example 4

(Red Paint)

| | |
|---|---|
| Beeswax | 15.8% by weight |
| Hydroxypropylgalactomannan | 2.0% by weight |
| Pigment Red 2 | 4.0% by weight |
| Preservative | 0.03% by weight |
| Dispersing Agent | 1.0% by weight |
| Surface-Active Agent/ Emulsifying agent | 0.4% by weight |
| Water | Remainder |

Example 5

(Blue Paint)

| Beeswax | 15.8% by weight |
| --- | --- |
| Hydroxypropylgalactomannan | 2.0% by weight |
| Pigment Blue 5:3 | 4.5% by weight |
| Preservative | 0.02% by weight |
| Dispersing Agent | 1.0% by weight |
| Surface-Active Agent | 0.5% by weight |
| Water | Remainder |

Example 6

(Finger Paint)

| Beeswax | 15.8% by weight |
| --- | --- |
| Hydroxypropylgalactomannan | 4.0% by weight |
| Pigment Red 2 | 4.0% by weight |
| Preservative | 0.02% by weight |
| Dispersing Agent | 1.0% by weight |
| Surface-Active Agent/ Emulsifying agent | 1.0% by weight |
| Water | Remainder |

Example 7

(Ink)

| Polyethylene Wax | 34.5% by weight |
| --- | --- |
| Coloring Agent | 1.0% by weight |
| Preservative | 0.02% by weight |
| Surface-Active Agent/ Emulsifying agent | 0.3% by weight |
| Water | Remainder |

Example 8

(White Ink)

| Montan Wax | 26.5% by weight |
| --- | --- |
| Pigment White 6 | 5.0% by weight |
| Preservative | 0.01% by weight |
| Surface-Active Agent | 0.4% by weight |
| Water | Remainder |

Example 9

(Yellow Ink)

| Polyethylene Wax | 44.9% by weight |
| --- | --- |
| Pigment Yellow 13 | 3.5% by weight |
| Preservative | 0.02% by weight |
| Dispersing Agent | 0.8% by weight |
| Surface-Active Agent | 0.6% by weight |
| Water | Remainder |

The aqueous agent for painting according to the present invention or the proposed liquid or pasty application material is composed essentially of water as the solvent, surface-active agent, coloring agent and possibly preservative and/or other additives, such as particularly binding agents as thickening agents and/or fillers and, as also proposed in the present invention, should contain a wax or a wax mixture which is present in the total mixture, and preferably also already as a mixing component or an initial product, in the emulsified or dispersed state.

In this connection, the emulsified state is considered that state in which the wax is present in particle sizes of <1 μm, while, on the other hand, a dispersion exists within the scope of this invention when the wax particles preferably have a size of >1 to approximately 10 μm.

Strictly speaking, the proposed agents or materials are basically dispersions because the added waxes, and the also preferably used color pigments, are not present in water in the solved state.

Particularly suitable waxes are beeswax, montan wax, carnauba wax, paraffin wax, montana wax, polyethylene wax, polypropylene wax or a mixture of two or more of these waxes, to the extent that they are compatible with each other.

The particle size of the wax particles should be <1 μm, particularly in the case of inks for wick-type and other capillary writing utensils; the particle size may be up to 12 μm, preferably up to 8 μm, particularly in more pasty agents and materials, such as, in brush paints or finger paints.

The surface-active agent and/or the emulsifying agent useful for obtaining a good adherence to as many different surfaces and grounds as possible may be a lanolin-sulfosuccinate, an ethoxylated lanolin or lanolin oil, a polyethylene-glycerine-monoisostrearate, a polyethylene-glycerine-monolaureate, a polyoxyethylene-glycerine-monooleate and/or an ethoxylated fatty alcohol.

For thickening or for adjusting the desired consistency of the agent, it may preferably contain hydroxypropylgalactomannan and/or another binding agent.

Serving as preservative is preferably an isothyazolinon or a 2-bromo-2-nitro-1,3-propandiol or, to the extent they are compatible, a mixture of these substances.

The coloring agent may be a water-soluble dye or a mixture of water-soluble dyes and maybe present and added as a dye powder or, alternatively and for obtaining a particularly high covering capacity and brilliancy of color, may be composed of pigments or of a mixture of several color pigments, wherein these pigments also preferably may be or should be present already before being admixed to the proposed agent or material as a pigment dispersion, particularly a pigment paste.

For a particular modification of the agent according to the present invention and for obtaining special effects of the strokes, calcium carbonate or oil, preferably paraffin oil, may also be added.

Particularly suitable have been found mixtures which contain 40% to 80% by weight water, 10% to 50% by weight wax or wax mixture, 0.1% to 2% by weight surface-active agent or emulsifying agent and 0.1% to 10% by weight coloring agent as well as 0.01% to 20% by weight other additives.

Preferably, the agent according to the present invention should or can contain 50% to 77% by weight water, 15% to 45% by weight wax or wax mixture, 0.1% to 1% by weight surface-active agent or emulsifying agent, 0.01% to 0.2% by weight preservative, 1% to 5% coloring agent, up to 5% by weight thickening agent, up to 2% by weight dispersing agent and up to 10% by weight other additives or, alternatively, the agent may be composed of 40% to 80% by weight water, 10% to 50% wax or wax mixture, 0.3% to 1% by weight surface-active agent, 0.8% to 1% by weight dispersing agent, 0.01% to 0.2% by weight preservative, 1% to 3% by weight thickening agent and 0.1% to 10% by weight coloring agent.

For achieving other or special effects when producing strokes, ink or poster paint can also be added in addition to chalk or oil, or ink or poster paint can be used after the application for painting over or for mixing.

The agents or materials according to the present invention are suitable to be applied on paper and textile as well as on wood, metal, synthetic materials, glass, ceramic materials, stone, on the skin or on other ground materials having rough or smooth surfaces.

Depending on the desired color character, by a suitable selection of the quantitative relationships of the individual components or by adding additional additives, it is possible to adjust or change the transparent opaque effect of the strokes or the applications and it is also easily possible to adjust or change the covering capacity, the glossiness, the capacity to being polished or the capacity to paint with water and the adherence to different grounds as well as the water resistance after drying.

These adjustments and changes can be carried out already during the manufacture of the agents or materials or they can be carried out to a large extent later by the user.

Depending on the components and the consistency, the agents or materials according to the present invention can be used, for example, in wick-type writing utensils of all types and so-called valve pens, in application devices using balls, or also for applying and/or painting with brushes, scrapers or fingers.

The applications which can be prepared may be, for example, inscriptions as well as drawings, dyeings, or re-dyeings, paintings, colorations, water colors, or other artful representations of various types.

It is a particular advantage that any desired dilutions of the agents or materials are just as easily possible as thickenings, that the strokes can also be painted over several times and that admixtures of other components are possible over a very wide spectrum, to the extent that they are compatible with each other.

The aqueous or painting agent or the liquid or pasty application material according to the present invention is very suitable for almost all applications which otherwise would only be possible either with pure aqueous agents or, on the other hand, only with oil paints, lacquers or other agents having predominantly organic solvents, and the agents or materials according to the present invention can in many cases replace these known but frequently problematic agents.

Because the proposed agents and materials do not contain organic solvents or other harmful substances, they are essentially safe physiologically and ecologically and are usually also suitable for use by children.

While specific embodiments of the invention have been described in detail to illustrate the inventive principles, it will be understood that the invention may be embodied otherwise without departing from such principles.

I claim:

1. An aqueous painting agent for use as a liquid or pasty application material, the agent comprising 40% to 80% by weight water, 10% to 50% by weight wax in an emulsified or dispersed state, 0.1% to 2% by weight surface-active agent, 0.1% to 10% by weight coloring agent, and 0.01% to 20% by weight additives selected from the group consisting of preservatives, thickening agents and fillers.

2. The aqueous agent according to claim 1, comprising 40% to 80% by weight water, 10% to 50% by weight wax, 0.3% to 1% by weight surface-active agent, 0.8% to 1% by weight dispersing agent, 0.01% to 0.2% by weight preservative, 1% to 3% by weight thickening agent and 0.1% to 10% by weight coloring agent.

3. The aqueous agent according to claim 1, comprising 50% to 77% by weight water, 15% to 45% by weight wax, 0.1% to 1% by weight surface-active agent or emulsifying agent, 0.01% to 0.2% by weight preservative, 1% to 5% by weight coloring agent, 0.% to 5% by weight thickening agent, 0% to 2% by weight dispersing agent, and 0% to 10% by weight other additives.

4. The aqueous agent according to claim 1, wherein the wax is a beeswax, montan wax, carnauba wax, paraffin wax, montana wax, polyethylene wax, polypropylene wax or a mixture of two or more of these waxes.

5. The aqueous agent according to claim 1, wherein the wax has a particle size of <1 µm.

6. The aqueous agent according to claim 1, wherein the wax has a particle size of 3 to 8 µm.

7. The aqueous agent according to claim 1, wherein the surface-active agent is selected from the group consisting of lanolin-sulfosuccinate, ethoxylated lanolin, ethoxylated lanolin oil, polyethylene-glycerine-monoisostereate, polyethylene-glycerine-monolaureate, polyoxyethylene-glycerine-monooleate and an ethoxylated fatty alcohol.

8. The aqueous agent according to claim 1, wherein the thickening agent comprises hydroxypropylgalactomannan.

9. The aqueous agent according to claim 1, wherein the preservative is an isothiazolinon or 2-bromo-2-nitro-1,3-propandiol or a mixture thereof.

10. The aqueous agent according to claim 1, wherein the coloring agent is a water-soluble dye or a mixture of water-soluble dyes.

11. The aqueous agent according to claim 10, wherein the dye or mixture of water-soluble dyes is a dye powder.

12. The aqueous agent according to claim 1, wherein the coloring agent is a pigment or a mixture of several pigments.

13. The aqueous agent according to claim 12, wherein the pigment or the mixture of several pigments is a pigment dispersion.

14. The aqueous agent according to claim 13, wherein the pigment dispersion is a pigment paste.

15. The aqueous agent according to claim 1, wherein the painting agent further comprises calcium carbonate or oil.

16. The aqueous agent according to claim 15, wherein the oil is paraffin oil.

* * * * *